(No Model.)

M. W. DEWEY.
ELECTRIC HOSE CARRIAGE.

No. 464,245. Patented Dec. 1, 1891.

WITNESSES:
J. J. Laass.
H. M. Seamans

INVENTOR,
Mark W. Dewey,
By Duell Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRIC HOSE-CARRIAGE.

SPECIFICATION forming part of Letters Patent No. 464,245, dated December 1, 1891.

Application filed February 24, 1891. Serial No. 382,517. (No model.)

*To all whom it may concern:*

Be it known that I, MARK W. DEWEY, of Syracuse, in the county of Onondaga, in the State of New York, have invented new and useful Improvements in Electric Hose-Carriages, (Case No. 85,) of which the following, taken in connection with the accompanying drawings, is a full, clear, and exact description.

My invention relates to certain improvements in electrically-propelled vehicles, and also in hose-carriages.

The object of my invention is to electrically propel a hose-carriage to and from a fire, so that it will not be necessary to employ horses for this purpose, to save time heretofore lost in hitching them to the carriage, allowing the carriage to be started the instant the alarm is sounded, and to provide a suitable and efficient hose-carriage for my electric fire-engine, patented February 17, 1891, No. 446,703.

The object of my invention also is to operate the hose-reel on the carriage electrically, preferably by the propelling-motor, and to operate said reel whenever desired, and whether the carriage is in motion or at rest. By doing this I am enabled to wind upon said reel a very long length of hose without uncoupling or separating the hose into short lengths, as usual, and without dragging it over the rough pavements, thus saving time and unnecessary wear upon the hose.

To this end my invention consists in the combination of a wheeled vehicle having two axles and a frame, a hose-reel mounted upon the frame, and an electric motor supported upon the vehicle and connected with the reel to revolve the same.

My invention consists, also, in the combination, in an electrically-propelled vehicle, of an electric motor mounted thereon and connected with the axle or wheels to propel the same, a secondary battery carried by the vehicle below the horizontal plane of the axis of the driving-wheels, and electric connections between the battery and the motor.

My invention consists, further, in the combination of a wheeled vehicle having two axles and a frame, an electric motor mounted thereon, a secondary battery carried by the vehicle, electric connections between the battery and the motor, a hose-reel mounted upon the frame having its axis above the horizontal plane of the axis of the wheels of the vehicle, and suitable means whereby the motor may propel the carriage or revolve the reel thereon, or both.

My invention consists, still further, in certain other combinations of parts hereinafter described, and specifically set forth in the claims.

Figure 1:
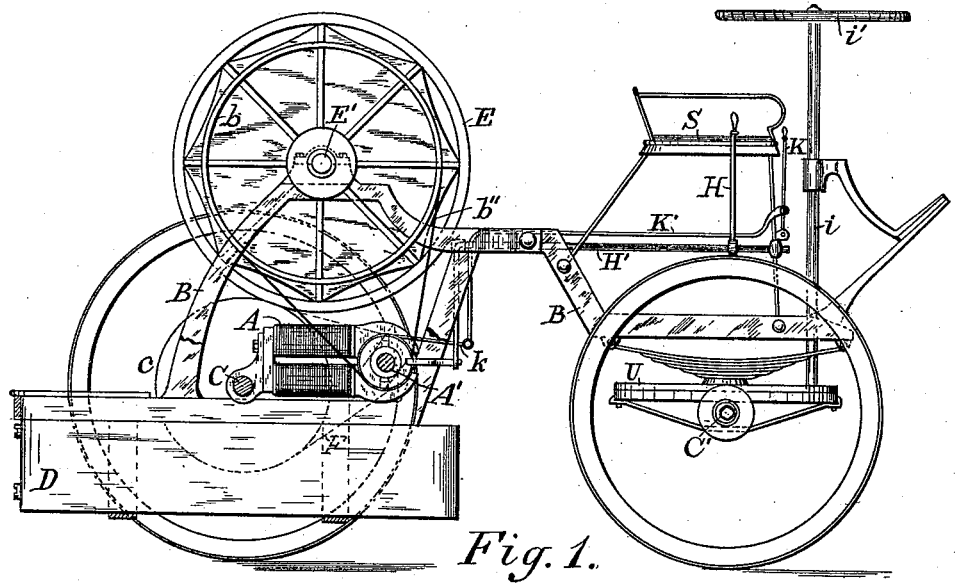
Figure 2:
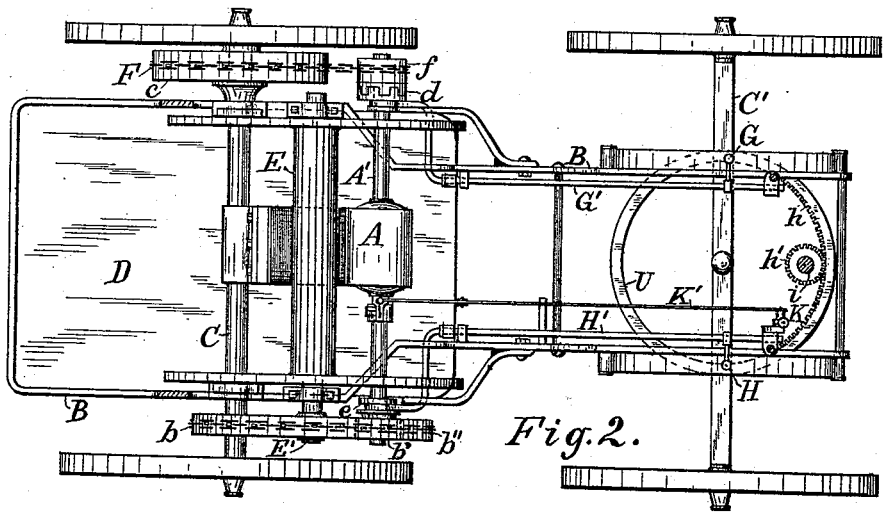
Figure 3:
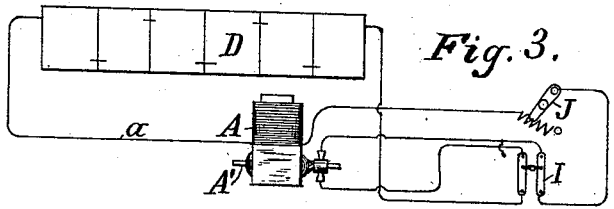

Referring briefly to the drawings, Figure 1 is a side elevation of my improved hose-carriage with a part of its frame broken away and a wheel removed to show the gearing clearly. Fig. 2 is a plan view of the same carriage with the seat and steering-wheel removed; and Fig. 3 is a diagrammatic view of certain parts of the apparatus, together with the circuits, &c., that may be employed.

In the drawings, A represents the electric motor, suitably secured to and supported by the frame B or rear axle C of the vehicle, or both, but preferably with its armature-shaft A' extending parallel to the rear axle C of the vehicle and above the horizontal plane of the axis of said axle to allow a secondary or storage battery or its receptacle D to be placed below said axle or below the horizontal plane thereof, which in turn allows the hose-reel to occupy its usual and preferred position above said plane. The battery is preferably placed low, also, in order that its weight may not render the vehicle top-heavy and to allow it to be removed and replaced easily.

E is the hose-reel, mounted upon the frame B, with its axis or its driving-shaft E' above the plane of the axis of the rear axle, and preferably parallel with the same. On an extension of the reel-shaft is a pulley $b$, and this pulley is shown connected with a smaller pulley $b'$ upon the armature-shaft A' of the motor by a belt or chain $b''$, and F is a belt or chain connecting another pulley $f$ upon the armature-shaft with a pulley, or preferably a compensating gear $c$, upon the rear axle C of the carriage to facilitate in turning corners or to allow the relative movement of the wheels carried by the said axle. I do not limit myself, however, to the belt or chain connections, as other suitable and well-known gearing may be employed instead.

G is a lever to operate the clutch mechanism *d* on the motor-shaft to disconnect the motor A from the axle, and H is a lever to operate the clutch mechanism *e* on the opposite end of the motor-shaft to connect the motor with the pump, or vice versa, when desired. The said levers are connected with the clutches through rotatable rods G' and H', journaled in the frame B and extending lengthwise of the carriage between the steersman's seat and the motor-shaft.

C' is the front axle of the carriage. U is the fifth-wheel, having one of its parts or circles rigidly or flexibly secured to said axle and having a rack *h* thereon for a gear-wheel *h'* to work in. *i* is an upright shaft extending upward from the said gear-wheel to a large hand-wheel *i'* directly in front of the steersman's seat S.

The carriage may be provided with the usual braking apparatus and a gong in a convenient position to be operated by the steersman while steering the vehicle.

It is preferred to keep two sets of batteries D charged at the engine-house, one being upon the carriage and the other held in reserve, so that the carriage may be supplied with a fully-charged battery upon its return to the house, to be in readiness for the next run.

The connection of the circuit *a* with respect to the motor A, the battery D, and the switching apparatus I and J is shown in Fig. 3 of the drawings.

Any suitable switching devices may, of course, be employed for controlling the motor; but for the sake of simplicity I have shown an ordinary current-reverser I for changing the direction of rotation of the armature and an adjustable resistance J for regulating the speed of said armature. By operating switch I the current flowing in the circuit *a*, connected to the battery, has its direction reversed through that portion of the circuit containing the armature-coils, whereby the direction of movement of the armature is reversed.

The switch J is an ordinary adjustable resistance in the circuit to regulate the speed of the motor, and may be placed on the front part of the engine in a convenient position to be operated by the hand or foot of the steersman or in any other suitable position. The velocity of the motor may be also regulated, if desired, by rotating the brushes of the commutator more or less around the shaft of the armature. This may be effected by the steersman by the movement of the lever K in front of the seat S. The said lever is supported and pivoted on one of the rods extending between the frame B and the seat and is connected with the brushes by means of a sliding rod K' and a link *k*.

Having described my invention, what I claim as new, and desire to secure by Letters Patent, is—

1. The combination, in an electrically-propelled vehicle, of an electric motor mounted thereon and connected with the axle or wheels to propel the same, a secondary battery carried by the vehicle below the horizontal plane of the axis of the driving-wheels, and electric connections between the battery and the motor.

2. The combination, in an electrically-propelled vehicle having two axles and a frame, of an electric motor mounted thereon and connected with the rear axle or wheels to propel the vehicle, a secondary battery carried by the vehicle below the horizontal plane of the axis of said wheels, and electric connections between the battery and the motor.

3. In a hose-carriage, the combination of a wheeled vehicle having two axles and a frame, a hose-reel mounted upon the frame, an electric motor supported upon the vehicle and connected with the reel to revolve the same, a battery mounted upon the frame of said vehicle, and electric connections between the battery and the motor.

4. The combination, in an electrically-propelled vehicle, of an electric motor mounted thereon and connected with the axle or wheels to propel the same, a secondary battery carried by the vehicle, electric connections between the battery and the motor, and a hose-reel mounted upon the frame of the vehicle supporting the battery.

5. The combination, in an electrically-propelled vehicle having two axles and a frame, of an electric motor mounted thereon and connected with the rear axle or wheels to propel the vehicle, a secondary battery carried by the vehicle below the horizontal plane of the axis of said wheels, electric connections between the battery and the motor, and a hose-reel mounted upon the frame of the vehicle above the said plane.

6. In a hose-carriage, the combination of a wheeled vehicle having two axles and a frame, an electric motor mounted thereon, a secondary battery supported by the frame of the vehicle, electric connections between the battery and the motor, a hose-reel mounted upon the frame of the vehicle supporting the battery, and suitable means whereby the motor may propel the carriage or revolve the reel, or both.

7. In a hose-carriage, the combination of a wheeled vehicle having two axles and a frame, an electric motor mounted thereon, a secondary battery carried and supported by the vehicle, electric connections between the battery and the motor, a hose-reel mounted upon the frame of said vehicle, having its axis above the horizontal plane of the axis of the wheels of the vehicle, and suitable means whereby the motor may propel the carriage or revolve the reel thereon, or both.

8. In a hose-carriage, the combination of a wheeled vehicle having two axles and a frame, an electric motor mounted thereon, a secondary battery carried by the vehicle and suspended from the frame below the horizontal plane of the axis of the rear wheels, electric connections between the battery and the motor, a hose-reel mounted upon the frame, having its axis above the horizontal plane of the axis of the wheels of the vehicle, and suitable means whereby the motor may propel the carriage or revolve the reel thereon, or both.

9. In a hose-carriage, the combination of a wheeled vehicle having two axles and a frame, an electric motor mounted thereon, a secondary battery mounted upon the frame of the vehicle, electric connections between the battery and the motor, a hose-reel mounted upon the frame above the battery, having its axis above the horizontal plane of the axis of the wheels of the vehicle and parallel to said axis, and suitable means whereby the motor may propel the carriage or revolve the reel thereon, or both.

10. In a hose-carriage, the combination of a wheeled vehicle having two axles and a frame, an electric motor mounted thereon, a secondary battery also supported thereon, electric connections between the battery and motor, a reel for winding and holding hose supported on said vehicle, and suitable means whereby the motor may propel the vehicle and operate the reel simultaneously.

11. In a hose-carriage, the combination of a wheeled vehicle having two axles and a frame, means connected to the front axle or wheel to steer the vehicle, a reel for winding and holding the hose mounted upon the frame, and an electric motor supported upon the vehicle and connected with the reel to operate the same.

In testimony whereof I have hereunto signed my name this 16th day of February, 1891.

MARK W. DEWEY. [L. S.]

Witnesses:
 C. H. DUELL,
 H. M. SEAMANS.